United States Patent
Kadoda et al.

(10) Patent No.: US 9,948,794 B2
(45) Date of Patent: Apr. 17, 2018

(54) REMOTE CONTROL TERMINAL APPARATUS, REMOTE CONTROL SYSTEM, REMOTE CONTROL METHOD, AND NON-TRANSITORY COMPUTER READABLE MEDIUM

(71) Applicant: FUJI XEROX CO., LTD., Tokyo (JP)

(72) Inventors: Akira Kadoda, Kanagawa (JP); Tadaaki Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/088,569

(22) Filed: Apr. 1, 2016

(65) Prior Publication Data

US 2017/0134593 A1     May 11, 2017

(30) Foreign Application Priority Data

Nov. 5, 2015    (JP) ................. 2015-217343

(51) Int. Cl.
| | |
|---|---|
| *G06F 3/12* | (2006.01) |
| *G05B 23/02* | (2006.01) |
| *G08B 1/08* | (2006.01) |
| *G09G 5/00* | (2006.01) |
| *H04N 1/00* | (2006.01) |

(52) U.S. Cl.
CPC ....... *H04N 1/00082* (2013.01); *H04N 1/0001* (2013.01); *H04N 2201/0075* (2013.01); *H04N 2201/0094* (2013.01)

(58) Field of Classification Search
CPC . G05B 23/02; G08B 1/08; G09G 5/00; H04N 1/00; G06F 3/12
USPC ....... 340/3.41, 539.32, 539.1, 12.5; 345/2.1; 358/1.14, 1.15
See application file for complete search history.

(56) References Cited

U.S. PATENT DOCUMENTS

| | | | | |
|---|---|---|---|---|
| 6,864,778 | B2 * | 3/2005 | Musschebroeck | G08C 17/02 340/12.52 |
| 7,375,673 | B2 * | 5/2008 | Spilo | G06F 8/65 340/12.16 |
| 7,948,374 | B2 * | 5/2011 | Chen | G08C 17/00 340/539.11 |
| 8,045,199 | B2 * | 10/2011 | Oak | G06F 3/1292 358/1.14 |
| 8,396,424 | B2 * | 3/2013 | Frazier | H04W 84/20 370/278 |
| 8,554,140 | B2 * | 10/2013 | Klemmensen | H04N 21/43637 455/41.2 |
| 8,665,474 | B2 * | 3/2014 | Kato | B41J 29/393 358/1.13 |
| 8,749,823 | B2 * | 6/2014 | Kato | G06F 3/1222 358/1.14 |

(Continued)

FOREIGN PATENT DOCUMENTS

JP      2014-007509 A     1/2014

*Primary Examiner* — Nam V Nguyen
(74) *Attorney, Agent, or Firm* — Oliff PLC (57) ABSTRACT

Provided is a remote control terminal apparatus including a controller that brings the remote control terminal apparatus into a state in which remote control on a remote control target apparatus is possible when a distance between the remote control terminal apparatus and the remote control target apparatus is less than a threshold value, and a notification unit that notifies other terminal apparatuses that the remote control is possible when the remote control is possible.

11 Claims, 8 Drawing Sheets

(56) References Cited

U.S. PATENT DOCUMENTS

| | | | | |
|---|---|---|---|---|
| 8,806,013 B2* | 8/2014 | Thero | ............... | H04N 1/00222 |
| | | | | 709/203 |
| 8,833,651 B2* | 9/2014 | Brown | ............... | G06K 19/0723 |
| | | | | 235/375 |
| 9,002,271 B2* | 4/2015 | Sakuda | ............... | H04W 76/066 |
| | | | | 358/1.13 |
| 9,135,530 B2* | 9/2015 | Tsujimoto | | |
| 9,542,134 B2* | 1/2017 | Okumura | ............... | G06F 3/1203 |
| 9,628,647 B2* | 4/2017 | Tomono | ............. | H04N 1/00413 |
| 9,641,707 B2* | 5/2017 | Kanbayashi | ....... | H04N 1/00392 |
| 2002/0016833 A1* | 2/2002 | Yajima | ............... | H04M 1/7253 |
| | | | | 709/220 |
| 2003/0071117 A1* | 4/2003 | Meade, II | ............. | G08C 17/00 |
| | | | | 235/382.5 |
| 2005/0276253 A1* | 12/2005 | Ho | ....................... | H04W 48/08 |
| | | | | 370/338 |
| 2007/0232281 A1* | 10/2007 | Nakai | .................... | H04W 8/26 |
| | | | | 455/414.1 |
| 2010/0109973 A1* | 5/2010 | Byun | ................. | H04L 12/2821 |
| | | | | 345/2.1 |
| 2013/0044341 A1* | 2/2013 | Uchino | ................. | G06F 3/0486 |
| | | | | 358/1.13 |
| 2014/0211252 A1* | 7/2014 | Tsujimoto | ............. | H04W 4/008 |
| | | | | 358/1.15 |
| 2015/0077787 A1* | 3/2015 | Nishimura | ......... | G03G 15/5075 |
| | | | | 358/1.14 |

* cited by examiner

REMOTE CONTROL TERMINAL APPARATUS, REMOTE CONTROL SYSTEM, REMOTE CONTROL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-217343 filed Nov. 5, 2015.

BACKGROUND (i) Technical Field

The present invention relates to a remote control terminal apparatus, a remote control system, a remote control method, and a non-transitory computer readable medium.

(ii) Related Art

When an image forming apparatus such as a multifunction machine is operated through remote control (remote access), exclusion of users is generally achieved according to the following method. In other words, information regarding a user who may use the image forming apparatus is transmitted to the image forming apparatus from a client terminal which performs remote access (or via another external authentication server), and thus the image forming apparatus is brought into a state of being logged in for the user. When a certain user has been already logged in, login of other users or other operations are excluded.

SUMMARY

According to an aspect of the invention, there is provided a remote control terminal apparatus including: a controller that brings the remote control terminal apparatus into a state in which remote control on a remote control target apparatus is possible when a distance between the remote control terminal apparatus and the remote control target apparatus is less than a threshold value; and a notification unit that notifies other terminal apparatuses that the remote control is possible when the remote control is possible.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described by exemplifying an image forming apparatus such as a multifunction machine as a remote control target apparatus.

Fundamental Principle

First, a fundamental principle of the present exemplary embodiment will be described.

Figure 1:
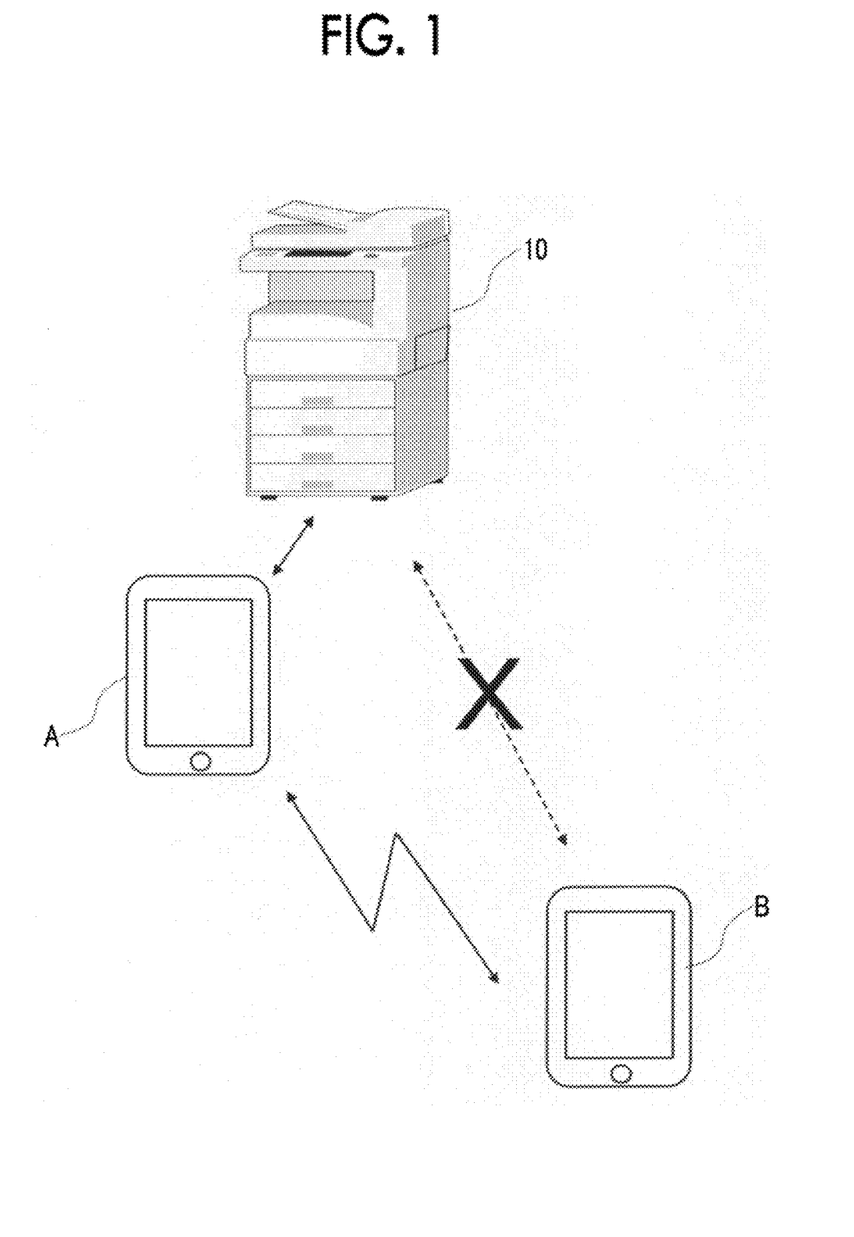
FIG. 1 is a system configuration diagram according to an exemplary embodiment.

FIG. 1 is a system configuration diagram according to the present exemplary embodiment. There are plural terminal apparatuses (hereinafter, simply referred to as "terminals") which operate an image forming apparatus 10 through remote control, and two terminals A and B are illustrated in FIG. 1. The two terminals A and B are not required to be of the same type, and may be of different types. The terminals A and B are illustrated as representatives of plural terminals, and, needless to say, the present exemplary embodiment is also applicable to three or more terminals.

The image forming apparatus 10 transmits short-range radio waves at constant time intervals. Here, a communication distance of the short-range radio waves is about 10 m to 20 m, but is not necessarily limited thereto.

Each of the terminals A and B includes a reception unit that receives the short-range radio waves transmitted by the image forming apparatus 10. Each of the terminals A and B detects a distance between each of the terminals A and B and the image forming apparatus 10 by using the reception intensity of the short-range radio waves received by the reception unit, and determines whether or not the detected distance is less than a threshold value.

It is assumed now that a distance detected by the terminal A is less than the threshold value so that the terminal A is relatively close to the image forming apparatus 10, and a distance detected by the terminal B is equal to or more than the threshold value so that the terminal B is relatively distant from the image forming apparatus 10.

In this case, the terminal A may perform remote control on the image forming apparatus 10, and this situation is displayed on a display unit of the terminal A so as to be presented to a user of the terminal A. The terminal A broadcasts a notification that the terminal A has acquired a preferential right (preferential use) for the image forming apparatus 10 and is using the image forming apparatus 10, with short-range radio waves.

It is assumed that a user of the terminal B moves toward the image forming apparatus 10 while the terminal A is performing the broadcast, and thus a distance detected by the terminal B is less than the threshold value. The terminal B may fundamentally use the image forming apparatus 10 since the detected distance is less than the threshold value, but if the terminal B receives the notification that the terminal A has acquired a preferential right (preferential use) for the image forming apparatus 10 and is using the image forming apparatus 10, the terminal B may recognize that there is already another terminal which is using the image forming apparatus 10. Therefore, a situation in which remote control is not possible is displayed on a display unit of the terminal B so as to be presented to the user of the terminal B, and thus the user is prohibited from operating the image forming apparatus 10 via the terminal B. In FIG. 1, an X mark indicates that only the terminal A may perform remote control on the image forming apparatus 10, and the terminal B is prohibited from performing remote control thereon.

On the other hand, when the terminal A finishes using the image forming apparatus 10, or the terminal A is moved and thus a distance between the terminal A and the image forming apparatus 10 becomes equal to or more than the threshold value, the terminal A stops the notification. Consequently, since the terminal B does not receive the notification from the terminal A, if a distance between the terminal B and the image forming apparatus 10 is less than the threshold value, the terminal B newly acquires a preferential right, and broadcasts a notification that the terminal B acquires the preferential right and is using the image forming apparatus 10, with short-range radio waves.

As mentioned above, in the present exemplary embodiment, a terminal side detects a distance between the terminal and the image forming apparatus 10, and, when the detected distance is less than a threshold value, and a notification that another terminal has acquired a preferential right is not received, the terminal acquires a preferential right for the image forming apparatus 10, and broadcasts a notification that the terminal has acquired the preferential right, to peripheral terminals. Even if the detected distance is less than the threshold value, when a notification that another terminal has acquired a preferential right is received, the terminal may not acquire a preferential right for the image forming apparatus 10, and remote control on the image forming apparatus 10 is restricted.

In the present exemplary embodiment, it is noted that the image forming apparatus 10 side does not determine the priority between plural terminals, and the terminals A and B sides autonomously determine the priority through direct communication between the terminals A and B. In the present exemplary embodiment, the image forming apparatus 10 just transmits short-range radio waves at constant time intervals, and is not involved with control of determination of the priority between the terminals A and B.

In the present exemplary embodiment, a terminal side has a function of detecting a distance between the terminal and the image forming apparatus 10 and determining whether or not the detected distance is less than a threshold value, and a function of acquiring a preferential right regarding remote control on the image forming apparatus 10 and notifying other terminals thereof in a condition in which notifications have not yet been received from other terminals. Therefore, the image forming apparatus 10 side does not have a function of determining the priority, and a terminal recognizes that another terminal which may perform remote control on the apparatus has already been present.

Configuration

Next, the present exemplary embodiment will be described in detail.

Figure 2:
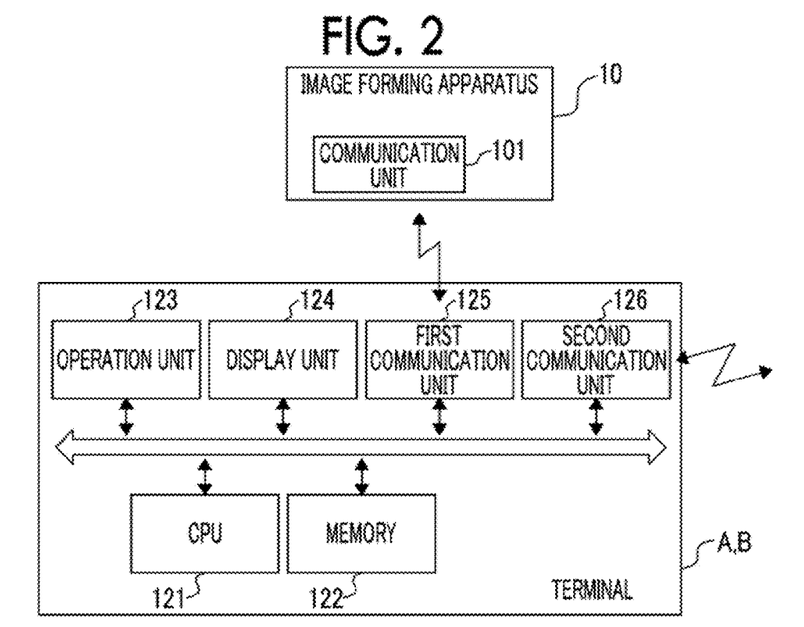
FIG. 2 is a configuration block diagram according to the exemplary embodiment.

FIG. 2 is a configuration block diagram according to the present exemplary embodiment. The image forming apparatus 10 includes a communication unit 101. On the other hand, each of the terminals A and B includes a CPU 121, a memory 122, an operation unit 123, a display unit 124, a first communication unit 125, and a second communication unit 126. Although not illustrated, an acceleration sensor or the like which detects movement of the terminals A and B may be provided.

The communication unit 101 of the image forming apparatus 10 transmits short-range radio waves at constant time intervals. As the short-range radio wave, for example, there is Bluetooth (registered trademark) or Wi-Fi; however, the short-range radio wave is not limited thereto. The communication unit 101 is not required to transmit a single type of short-range radio wave, and may transmit a combination of plural types of short-range radio waves such as Bluetooth and Wi-Fi.

The CPU 121 of each of the terminals A and B performs a process which will be described below in detail according to a processing program stored in the memory 122 in advance.

The operation unit 123 receives an operation from a user operating each of the terminals A and B. The operation unit 123 may be not only various buttons or switches but also touch buttons displayed on a touch panel. The user's operation information received via the operation unit 123 is supplied to the CPU 121.

The display unit 124 displays various states of each of the terminals A and B under the control of the CPU 121. Particularly, in the present exemplary embodiment, possibility of remote control on the image forming apparatus 10 is displayed.

The first communication unit 125 performs communication with the communication unit 101 of the image forming apparatus 10. The first communication unit 125 receives short-range radio waves from the communication unit 101, and detects and supplies the intensity thereof to the CPU 121. The CPU 121 detects a distance between the image forming apparatus 10 and each of the terminals A and B by using the radio wave intensity.

The first communication unit 125 transmits various commands for performing remote control on the image forming apparatus 10 to the communication unit 101 of the image forming apparatus 10 under the control of the CPU 121 based on an operation from the operation unit 123. When the image forming apparatus 10 is a multifunction machine having a copying function, a scanning function, and a FAX function, the various commands are a copying command, a scanning command, a FAX command, and the like.

The second communication unit 126 transmits short-range radio waves to other terminals at constant time intervals under a predetermined condition under the control of the CPU 121 so as to perform a notification that a preferential right has been acquired, and the image forming apparatus 10 is being used. Short-range radio waves which are transmitted under a predetermined condition are received from another terminal.

The CPU 121 evaluates the detected distance between each of the terminals A and B and the image forming apparatus 10 in three stages. In other words, the detected distance is evaluated in levels of three stages such as (1) close distance, (2) short distance, and (3) long distance (far away at a distance equal to or more than the short distance). Regarding a level corresponding to a detected distance, for example, a first threshold value and a second threshold value are stored in the memory 122 (here, the first threshold value>the second threshold value), and the threshold values are read from the memory 122 and are compared with the detected distance. If the detected distance is less than the second threshold value, the distance is determined as a close distance. If the detected distance is equal to or more than the second threshold value and is less than the first threshold value, the distance is determined as a short distance, and if the detected distance is equal to or more than the first threshold value, the distance is determined as a long distance. As an example, when a communication distance of the short-range radio wave is 10 m, if the detected distance is less than 2 m, the distance is determined as a close distance. If the detected distance is less than 4 m, the distance is determined as a short distance, and if the detected distance is equal to or more than 4 m, the distance is determined as a long distance.

In a case of performing detection and evaluation of a distance, the CPU 121 may perform the detection and evaluation in any modes of (a) use of only Bluetooth, (b) use of only Wi-Fi, and (c) use of both Bluetooth and Wi-Fi. Use of any one of the modes may be manually set by the user operating the operation unit 123, or may be automatically set according to a program. When a mode is automatically set according to the program, the terminals A and B periodically check a communication state with the image forming apparatus 10 and switch the modes. In the mode (c), that is, when both Bluetooth and Wi-Fi are used, the CPU 121 uses either of Bluetooth and Wi-Fi depending on a level of a distance (that is, a distance is not detected with both of the two, and one evaluation result is used).

Table 1 exemplifies the type of short-range radio wave to be used for each level.

TABLE 1

|  | Set Pattern 1 | Set Pattern 2 | Set Pattern 3 |
| --- | --- | --- | --- |
| Long Distance | Wi-Fi | Wi-Fi | Bluetooth |
| Short Distance | Bluetooth | Wi-Fi | Wi-Fi |
| Close Distance | Bluetooth | Bluetooth | Wi-Fi |

In Table 1, in the set pattern 1, a long distance is evaluated with the radio wave intensity of Wi-Fi, and a short distance and a close distance are evaluated with Bluetooth.

In the set pattern 2, a long distance and a short distance are evaluated with the radio wave intensity of Wi-Fi, and a close distance is evaluated with the radio wave intensity of Bluetooth.

In the set pattern 3, a long distance is evaluated with the radio wave intensity of Bluetooth, and a short distance and a close distance are evaluated with the radio wave intensity of Wi-Fi.

Use of any one of the set patterns 1 to 3 may be set according to a program in advance, or may be manually set by the user of the terminal A operating the operation unit 123.

The CPU 121 evaluates a distance between each of the terminals A and B and the image forming apparatus 10 at constant time intervals, but resumes distance evaluation at any one of the following timings in a state in which the distance evaluation is stopped.

When an application in the terminal transitions from a background to a foreground When a state value is changed by an acceleration sensor of the terminal When there is a manual instruction from the user of the terminal On the other hand, the CPU 121 stops the distance evaluation at a timing at which any one of the following conditions is satisfied.

When determined as a long distance, and then there is no change in a state in which the long distance is determined for a predetermined time period When a distance may not be evaluated due to disconnection of communication, a radio wave reception unable state, or the like When the user of the terminal appears not to operate the terminal based on an output signal from the acceleration sensor of the terminal When there is a manual instruction from the user of the terminal Therefore, for example, when a distance between the terminal and the image forming apparatus 10 is determined as a long distance, and then there is no change in a state in which the long distance is determined for a predetermined time period, the CPU 121 stops distance evaluation. During that time, the CPU 121 monitors a detection value from the acceleration sensor, and resumes the distance evaluation when a state value from the acceleration sensor changes.

Figure 3:
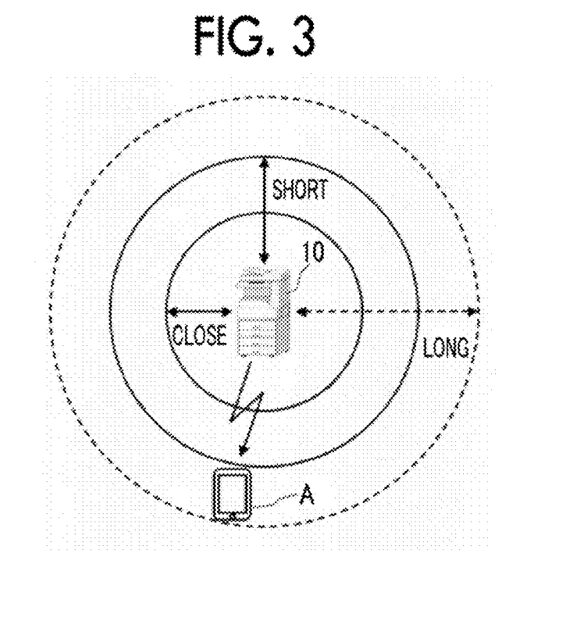
FIG. 3 is an explanatory diagram when a terminal A is present at a long distance.

FIG. 3 schematically illustrates a positional relationship between the image forming apparatus 10 and the terminal A. The CPU 121 of the terminal A detects and evaluates a distance between the terminal A and the image forming apparatus 10 in the above-described conditions, and determines the distance between the terminal A and the image forming apparatus 10 as a "long distance". In this case, the CPU 121 does not perform particular display regarding remote control on the display unit 124. Therefore, the user of the terminal A may not perform remote control on the image forming apparatus 10.

Figure 4:
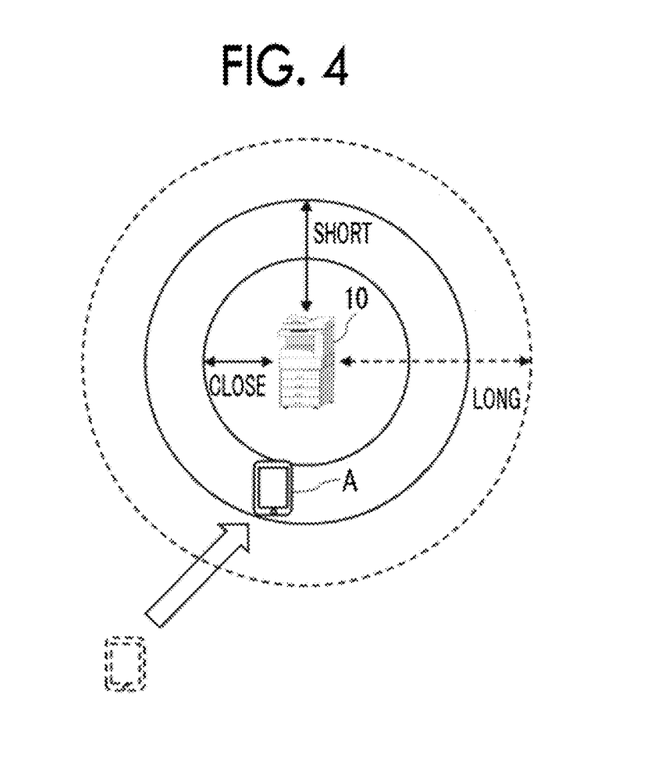
FIG. 4 is an explanatory diagram when the terminal A is present at a short distance.

FIG. 4 illustrates a positional relationship when the user of the terminal A in the state illustrated in FIG. 3 moves and comes close to the image forming apparatus 10. The CPU 121 of the terminal A detects and evaluates a distance between the terminal A and the image forming apparatus 10 in the above-described conditions, and determines the distance between the terminal A and the image forming apparatus 10 as a "short distance". In this case, the CPU 121 determines whether or not the second communication unit 126 has received short-range radio waves from other terminals, and displays information indicating that the image forming apparatus 10 is available on the display unit 124 and notifies the user of the information as long as the second communication unit 126 has not received the short-range radio waves. A description will be made later of a process when short-range radio waves have been received from other terminals.

Figure 5:
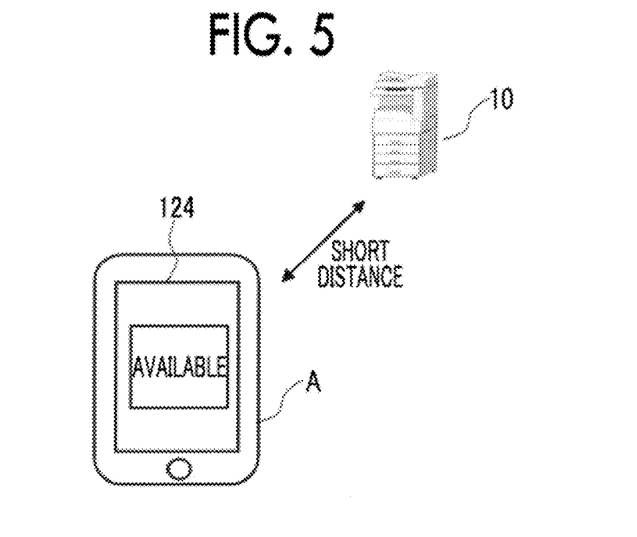
FIG. 5 is a display state diagram when the terminal A is present at a short distance.

FIG. 5 exemplifies a display state of the display unit 124 at a timing at which a distance between the terminal A and the image forming apparatus 10 is determined as a "short distance". The CPU 121 displays a message of "available" on the display unit 124. The user visually recognizes the message and operates the terminal A and may thus easily understand that the user is allowed to perform remote control on the image forming apparatus 10, that is, the user has a preferential right for the remote control on the image forming apparatus 10.

Figure 6:
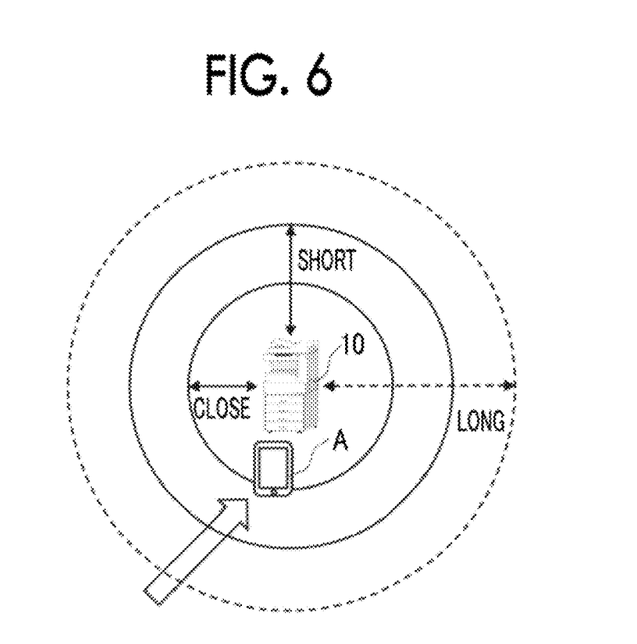
FIG. 6 is an explanatory diagram when the terminal A is present at a close distance.

FIG. 6 illustrates a positional relationship when the user of the terminal A in the state illustrated in FIG. 4 further moves and comes closer to the image forming apparatus 10. The CPU 121 of the terminal A detects and evaluates a distance between the terminal A and the image forming apparatus 10, and determines the distance between the terminal A and the image forming apparatus 10 as a "close distance". In this case, the CPU 121 displays a dialogue for checking whether or not the image forming apparatus 10 will be actually used, on the display unit 124.

Figure 7:
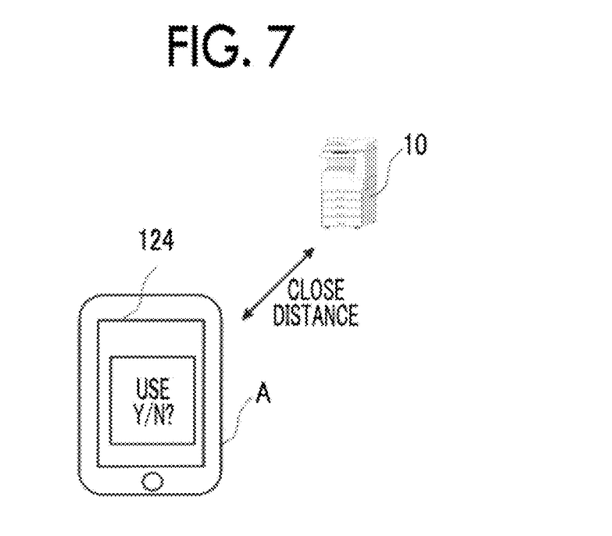
FIG. 7 is a display state diagram when the terminal A is present at a close distance.

FIG. 7 exemplifies a display state of the display unit 124 at a timing at which a distance between the terminal A and the image forming apparatus 10 is determined as a "close distance". The CPU 121 displays a use checking dialogue such as "use Y/N?" on the display unit 124. The user visually recognizes the dialogue and may thus confirm that remote control on the image forming apparatus 10 is actually possible. If the user gives an instruction for "use" on the dialogue by operating the operation unit 123, remote control becomes possible. It is noted that the message of "available" is displayed at a "short distance", but remote control on the image forming apparatus 10 is not actually possible, and the remote control becomes possible at a "a close distance" when the user gives an instruction for the use. It may be said that a preferential right is acquired at a "short distance", and actual remote control is performed at a "close distance" under the acquired preferential right.

Figure 8:
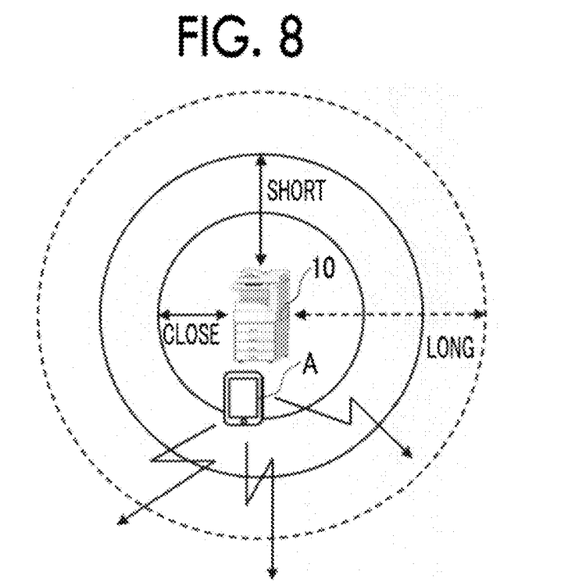
FIG. 8 is a diagram illustrating a notification state from the terminal A.

FIG. 8 illustrates a positional relationship when the user gives an instruction for "use" in the state illustrated in FIG. 7. The CPU 121 of the terminal A controls the second communication unit 126 to transmit (broadcast) short-range radio waves at a predetermined time interval. The transmission of the short-range radio waves indicates that the terminal A has already acquired the preferential right and is using the image forming apparatus 10. In other words, the transmission of the short-range radio waves may be a notification indicating that "the terminal A has acquired the preferential right and is using the image forming apparatus 10".

The transmission of the short-range radio waves is continuously performed as long as the terminal A is present at a "close distance". Therefore, the transmission of the short-range radio waves is stopped at a timing at which the user of the terminal A in the state illustrated in FIG. 8 moves and the detected distance is determined as a "short distance" or a "long distance". A message of "use completion" may be transmitted before stopping the transmission of the short-range radio waves. Even if the user is present at a "close distance", the transmission of the short-range radio waves may be stopped when an instruction for completion is given from the user. Even if the user is present at a "close distance", the transmission of the short-range radio waves may be stopped when there is no user's operation for a predetermined time period.

When the user gives an instruction for "no use" after the dialogue is displayed, or the user does not give an instruction for "use" within a predetermined time period from the display of the dialogue, the CPU 121 erases the dialogue displayed on the display unit 124, and does not transition to an operable state. Therefore, in this case, even the transmission of the short-range radio waves as illustrated in FIG. 8 is not performed.

Figure 9:
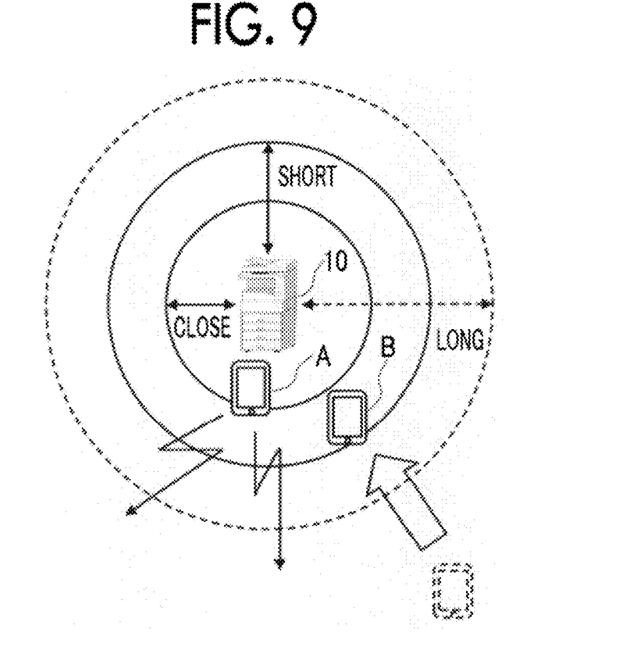
FIG. 9 is an explanatory diagram when a terminal B is present at a short distance in addition to the terminal A.

FIG. 9 illustrates a positional relationship when the user of the terminal B moves and thus comes close to the image forming apparatus 10 so as to be present at a "short distance", in the state illustrated in FIG. 8.

If a distance between the terminal B and the image forming apparatus 10 is determined as a "short distance", the CPU 121 of the terminal B determines whether or not short-range radio waves are received from other terminals by using the second communication unit 126. If the short-range radio waves are received from the terminal A, a message of "unavailable" is displayed on the display unit 124 since the terminal A has already had the preferential right and is using the image forming apparatus 10.

Figure 10:
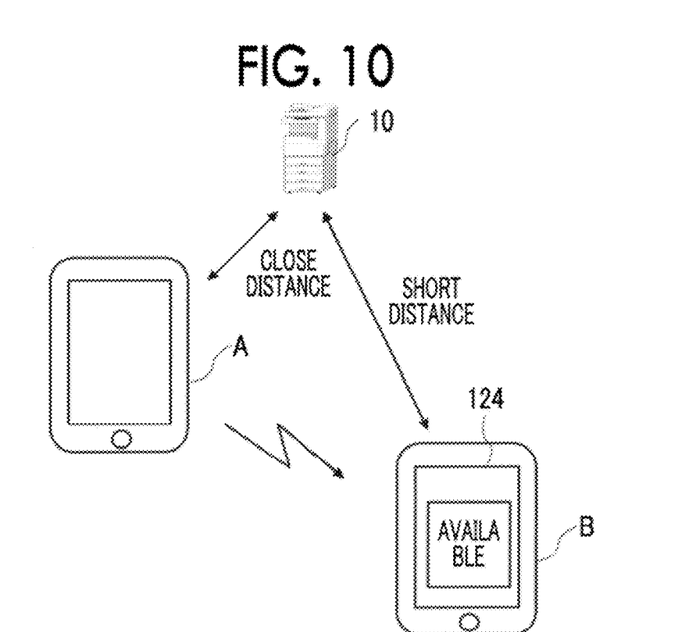
FIG. 10 is a display state diagram when a terminal B is present at a short distance in addition to the terminal A.

FIG. 10 exemplifies a display state of the display unit 124 of the terminal B at a timing at which a distance between the terminal B and the image forming apparatus 10 is determined as a "close distance", and short-range radio waves are received from the other terminal A. A message of "unavailable" is displayed on the display unit 124 of the terminal B. When FIG. 5 is compared with FIG. 10, it may be seen that the content of a message displayed on the display unit 124 changes depending on whether or not another terminal has already acquired a preferential right and is using the image forming apparatus 10. The user of the terminal B visually recognizes the message of "unavailable", and thus may easily understand that the terminal B is unable to perform remote control since the terminal A has already been using the image forming apparatus 10. When the message "unavailable" is displayed, the CPU 121 does not receive a user's operation regarding remote control on the image forming apparatus 10 from the operation unit 123 at all. Alternatively, when a touch button for remote control is displayed on the display unit 124, and remote control is received, the touch button is not displayed.

When the CPU 121 of the terminal B is displaying the message "unavailable" on the display unit 124, for example, when the user of the terminal A manually gives an instruction for use completion, and thus the second communication unit 126 of the terminal A stops the transmission of the short-range radio waves (or a message of "use completion" is transmitted prior thereto), the second communication unit 126 of the terminal B does not receive the short-range radio waves from the terminal A (or the message of "use completion" is received prior thereto), which as a trigger causes the CPU 121 of the terminal B to display a message of "available" on the display unit 124.

Figure 11:
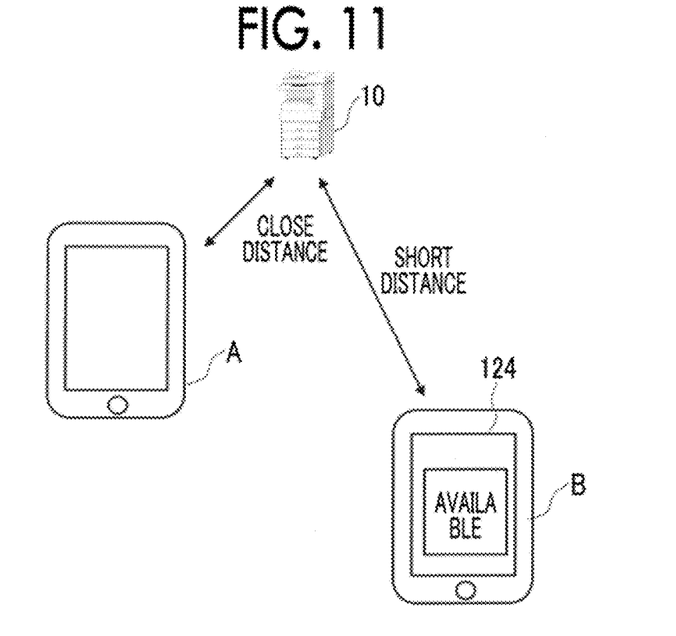
FIG. 11 is a display state diagram when there is no notification from the terminal A.

FIG. 11 exemplifies a display state of the display unit 124 of the terminal B at a timing at which the transmission of the short-range radio waves from the terminal A is stopped. The message of "available" is displayed on the display unit 124 of the terminal B. The user of the terminal B visually recognizes the message and may thus easily understand completion of the use in the terminal A which has acquired the preferential right and has been using the image forming apparatus 10, and acquisition of a preferential right for the image forming apparatus 10 in the terminal B instead of the terminal A.

Figure 12:
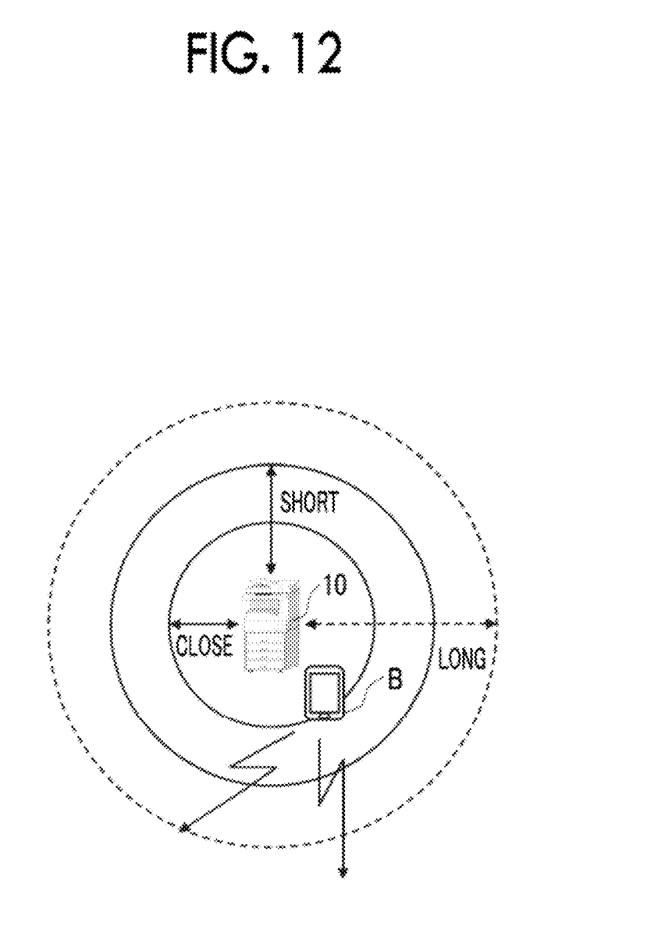
FIG. 12 is an explanatory diagram when only the terminal B is present at a close distance.

FIG. 12 illustrates a positional relationship when the user of the terminal B in the state illustrated in FIG. 11 further moves, and comes closer to the image forming apparatus 10 so that a "close distance" is determined. The CPU 121 of the terminal B displays a dialogue of "use Y/N?" on the display unit 124 in the same manner as in FIG. 7, and, if the user of the terminal B gives an instruction for "use", the second communication unit 126 of the terminal B is controlled to transmit (broadcast) short-range radio waves at a predetermined time interval, and thus notifies other terminals of information indicating that the terminal B has acquired a preferential right and is using the image forming apparatus 10.

When still another terminal is present at a "short distance" in the state illustrated in FIG. 12, the terminal receives short-range radio waves from the terminal B, and displays a message of "unavailable" on a display unit thereof so as to notify a user of the terminal that the terminal B has already acquired the preferential right and is using the image forming apparatus 10. On the other hand, in the state illustrated in FIG. 12, when still another terminal is present at a "long distance", the terminal is not located at a "short distance" yet, and thus does not receive short-range radio waves from the terminal B. Therefore, a message of "unavailable" is not displayed on a display unit of the terminal.

Figure 13:
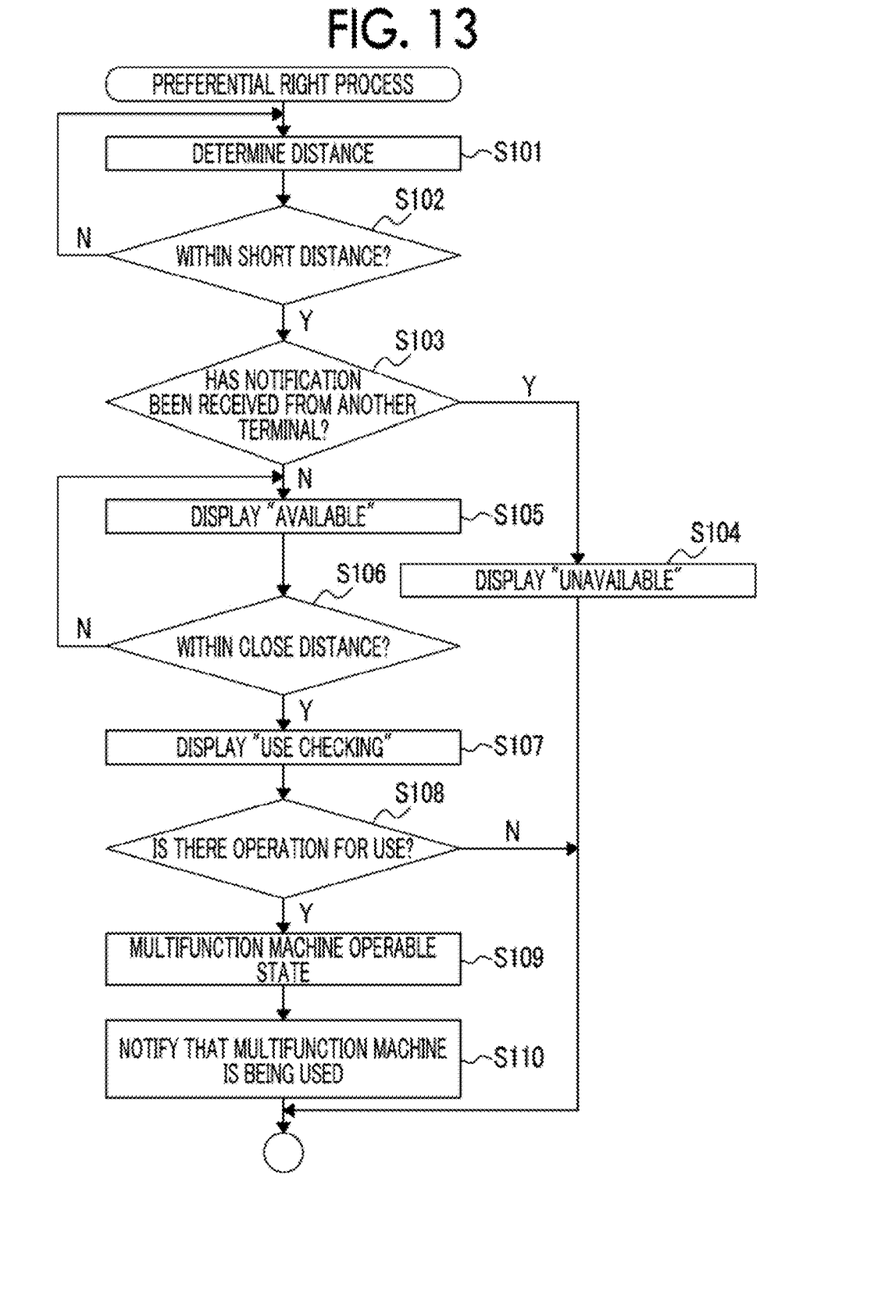
FIG. 13 is a flowchart illustrating a fundamental process according to the exemplary embodiment.

FIG. 13 is a flowchart illustrating a preferential right process according to the present exemplary embodiment, and illustrates a process performed by the CPU 121 of each of the terminals A and B.

First, the CPU 121 determines (evaluates) a distance between the terminal and the image forming apparatus 10 by using the intensity of short-range radio waves from the image forming apparatus 10, received by the first communication unit 125 (step S101). Whether or not the distance between the terminal and the image forming apparatus 10 is a "short distance" is determined through comparison with the first threshold value (step S102), and, if the distance is not a "short distance" but a "long distance" (NO in step S102), a distance is continuously determined. If the distance is a "short distance" (YES in step S102), then, it is determined whether or not the second communication unit 126 has received a notification from another terminal (step S103).

When the distance is determined as being a "short distance", and a notification has been received from another terminal, the CPU 121 displays a message of "unavailable" on the display unit 124 (step S104). In this case, a notification that the image forming apparatus is being used is not naturally transmitted. On the other hand, when the distance is determined as being a "short distance", and a notification has not been received from another terminal, the CPU 121 displays a message of "available" on the display unit 124 so as to inform the user that a preferential right has been acquired.

When the message of "available" is displayed, the CPU 121 then determines whether or not a distance between the terminal and the image forming apparatus 10 is a "close distance" through comparison with the second threshold value (step S106). When the terminal is not present at a "close distance" and is still present at a "short distance", message of "available" is continuously displayed. When the user of the terminal moves from a "short distance" to a "long distance", the message of "available" is erased.

If the terminal is present at a "close distance" (YES in step S106), the CPU 121 displays a use checking dialogue on the display unit 124 (step S107). When the user gives an instruction for "use" in response to the dialogue (YES in step S108), the CPU 121 transitions to an operable state for the image forming apparatus 10 such as a multifunction machine (step S109). The operable state for the image forming apparatus 10 indicates a state in which the terminal may perform remote control on the image forming apparatus 10, and indicates a state in which various commands are able to be transmitted to the image forming apparatus 10 via the first communication unit 125 by using the operation unit 123 (including touch buttons displayed on the display unit 124) of the terminal. In this state, the user transmits, for example, a "copying" command, a "scanning" command, and a "FAX transmission" command to the image forming apparatus 10 so as to execute various functions of the image forming apparatus 10. The CPU 121 transitions to the operable state, and transmits (broadcasts) a notification that the preferential right has been acquired and the image forming apparatus 10 is being used, to other terminals via the second communication unit 126 (step S110). When the user completes an operation of the image forming apparatus 10, if the user manually gives an instruction for the completion, the CPU 121 stops the notification that the preferential right has been acquired and the image forming apparatus 10 is being used. Prior to the notification, a notification of "use completion" may be transmitted as described above.

On the other hand, if the user gives an instruction for "no use" on the dialogue (NO in step S108), the CPU 121 does not transition to an operable state for the image forming apparatus 10 and does not also transmit a notification that the image forming apparatus 10 is being used.

As described above, in the present exemplary embodiment, since there is a configuration in which the preferential right acquisition process is performed, in a terminal, and the terminal having acquired the preferential right transmits a notification that the image forming apparatus 10 is being used, to other terminals, it is not necessary to give a function of determining the priority to the image forming apparatus 10 side, and it is possible to easily understand whether or not a terminal which may operate the image forming apparatus 10 is already been present among plural terminals. When a certain terminal acquires a preferential right but does not actually use the image forming apparatus 10 through remote control, a notification that the image forming apparatus 10 is being used is not transmitted, and thus remote control performed by another terminal is not unnecessarily restricted.

The present invention is not limited to the exemplary embodiment and may be variously modified. For example, in the present exemplary embodiment, when a notification that the terminal A has acquired a preferential right and is using the image forming apparatus 10 is transmitted, the CPU 121 of the other terminal B displays a message of "unavailable" on the display unit 124, but there may be a configuration in which, when the image forming apparatus 10 may simultaneously accept plural jobs, the terminal B may perform remote control regarding the jobs. Specifically, when the image forming apparatus 10 may simultaneously accept plural printing processes (in this case, the image forming apparatus 10 temporarily stores the accepted printing processes and sequentially executes the printing processes), the CPU 121 of the terminal A specifies the type of job which is used (in this case, the printing process) and performs a notification thereof when transmitting a notification that a preferential right has been acquired and the image forming apparatus 10 is being used. The CPU 121 of the terminal B receives the notification from the terminal A, specifies the job, determines that printing processes are able to be simultaneously performed, and displays a message of "printing process is possible" instead of a message of "unavailable" on the display unit 124. On the other hand, when the image forming apparatus 10 is unable to simultaneously accept plural scanning processes, the CPU 121 of the terminal A specifies the type of job which is used (in this case, the scanning process) and performs a notification thereof when transmitting a notification that a preferential right has been acquired and the image forming apparatus 10 is being used. The CPU 121 of the terminal B receives the notification from the terminal A, specifies the job, determines that scanning processes are unable to be simultaneously performed, and displays a message of "scanning process is not possible" on the display unit 124. As mentioned above, remote control in other terminals may be performed depending on the type of job (or the type of command).

In the present exemplary embodiment, the communication unit 101 is provided in the image forming apparatus 10, but the communication unit 101 is not required to be provided in the image forming apparatus 10 in advance, and may be added as an extension function by connecting a USB having a communication function to the image forming apparatus 10. Communication between the image forming apparatus 10 and a terminal is only short-range radio communication performed by the image forming apparatus 10 in a direction from the image forming apparatus 10 to the terminal. Since communication between terminals is also direct communication (peer-to-peer communication) without using the image forming apparatus 10, fundamentally, the communication is not limited by the type of the image forming apparatus 10.

In the present exemplary embodiment, when a distance between the terminal and the image forming apparatus 10 is less than the second threshold value, the distance is determined as a "close distance", when the distance is equal to or more than the second threshold value and less than the first threshold value, the distance is determined as a "short distance", and when the distance is equal to or more than the first threshold value, the distance is determined as a "long distance", and the preferential right acquisition process is controlled according to the three levels. However, when a distance between the terminal and the image forming apparatus 10 is less than a threshold value, the distance is determined as a "short distance", and when the distance is equal to or more than the threshold value, the distance is determined as a "long distance", and the preferential right acquisition process is controlled according to the two levels. In this case, when the terminal A is present at a short distance, the terminal A acquires a preferential right, displays a use checking dialogue on the display unit 124, transitions to a remote controllable state when the user gives an instruction for "use", and transmits (broadcasts) information indicating that the preferential right has been acquired and the image forming apparatus 10 is being used, to the terminal B.

The threshold value may be set according to a distance at which the terminal A may perform remote control on the image forming apparatus 10 (a distance at which commands are able to be transmitted and received).

In the present exemplary embodiment, the preferential right acquisition process is performed by the CPU 121 of the terminal executing the processing program stored in the memory 122, but the terminal may be a general purpose computer, a smart phone, a tablet, or the like, including a microprocessor such as a CPU, a ROM, a RAM, a semiconductor memory, and a network interface, and some or all processes performed by the CPU 121 may be realized by a hardware circuit such as a dedicated LSI, an ASIC, or an FPGA.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A remote control terminal apparatus comprising:
   a controller that displays, on a display unit, a message indicating a preferential use for a remote control target apparatus when a distance between the remote control terminal apparatus and the remote control target apparatus is less than a first threshold value, and brings the remote control terminal apparatus into a state in which controlling the remote control target apparatus is possible when the distance between the remote control terminal apparatus and the remote control target apparatus is less than a second threshold value, the second threshold value being smaller than the first threshold value;
   a notification unit configured to notify other terminal apparatuses whether or not controlling the target apparatus is possible, the notification unit notifying the other terminal apparatuses directly by radio wave, without using the remote control target apparatus; and
   a first communication unit configured to send commands to remotely operate the remote control target apparatus, wherein the first communication unit simultaneously sends commands to remotely operate the remote control target apparatus when the notification unit notifies the other terminal apparatuses that controlling the target apparatus is not possible.

2. The remote control terminal apparatus according to claim 1,
   wherein the controller does not bring the remote control terminal apparatus into the state in which controlling the remote control target apparatus is possible when a notification is received from another terminal apparatus, even if the distance between the remote control terminal apparatus and the remote control target apparatus is less than the second threshold value.

3. The remote control terminal apparatus according to claim 2,
   wherein the controller does not bring the remote control terminal apparatus into a state in which controlling the remote control target apparatus to perform a type of job is possible when the notification in which the type of job is specified is received from another terminal apparatus, even if the distance between the remote control terminal apparatus and the remote control target apparatus is less than the second threshold value.

4. The remote control terminal apparatus according to claim 3, wherein the remote control target apparatus is an image forming apparatus.

5. The remote control terminal apparatus according to claim 2, wherein the remote control target apparatus is an image forming apparatus.

6. The remote control terminal apparatus according to claim 1, wherein the remote control target apparatus is an image forming apparatus.

7. The remote control terminal apparatus according to claim 1,
   wherein, when the distance between the remote control terminal apparatus and the remote control target apparatus is less than the second threshold value, the controller brings the remote control terminal apparatus into a state in which controlling the remote control target apparatus to perform a type of job is possible when a notification in which the type of job is specified is received from another terminal apparatus.

8. A remote control system comprising:
   a remote control target apparatus that transmits a radio wave at a predetermined time interval; and
   a remote control terminal apparatus that controls the remote control target apparatus,
   wherein the remote control terminal apparatus includes:
      a controller that displays, on a display unit, a message indicating a preferential use for the remote control target apparatus when a distance between the remote control terminal apparatus and the remote control target apparatus is less than a first threshold value, and brings the remote control terminal apparatus into a state in which controlling the remote control target apparatus is possible when the distance between the remote control terminal apparatus and the remote control target apparatus is less than the second threshold value, the second threshold value being smaller than the first threshold value;
      a notification unit configured to notify other terminal apparatuses whether or not controlling the target apparatus is possible, the notification unit notifying the other terminal apparatuses directly by radio wave, without using the remote control target apparatus; and a first communication unit configured to send commands to remotely operate the remote control target apparatus, wherein the first communication unit simultaneously sends commands to remotely operate the remote control target apparatus when the notification unit notifies the other terminal apparatuses that controlling the target apparatus is not possible.

9. A remote control method comprising:

detecting a distance between a remote control terminal apparatus and a remote control target apparatus;

displaying a message indicating a preferential use for a remote control target apparatus when the distance between the remote control terminal apparatus and the remote control target apparatus is less than a first threshold value, and bringing the remote control terminal apparatus into a state in which controlling the remote control target apparatus is possible when the distance between the remote control terminal apparatus and the remote control target apparatus is less than a second threshold value, the second threshold value being smaller than the first threshold value;

notifying other terminal apparatuses whether or not controlling the target apparatus is possible, the notifying performed directly by radio wave, without using the remote control target apparatus; and when remotely operating the target apparatus, the control terminal apparatus is configured to simultaneously send control commands to remotely operate the remote control target apparatus by a first communication unit and notify the other terminal apparatuses that controlling the remote control target apparatus is not possible by a notification unit.

10. A non-transitory computer readable medium storing a program causing a computer to execute:

detecting a distance between a remote control terminal apparatus and a remote control target apparatus;

displaying a message indicating a preferential use for the remote control target apparatus when a distance between the remote control terminal apparatus and the remote control target apparatus is less than a first threshold value, and bringing the remote control terminal apparatus into a state in which controlling the remote control target apparatus is possible when the distance between the remote control terminal apparatus and the remote control target apparatus is less than a second threshold value, the second threshold value being smaller than the first threshold value;

notifying other terminal apparatuses whether or not controlling the target apparatus is possible, the notifying performed directly by radio wave, without using the remote control target apparatus; and when remotely operating the target apparatus, the control terminal apparatus is configured to simultaneously send control commands to remotely operate the remote control target apparatus by a first communication unit and notify the other terminal apparatuses that controlling the remote control target apparatus is not possible by a notification unit.

11. A remote control terminal apparatus comprising:

a controller that brings the remote control terminal apparatus into a state in which controlling a remote control target apparatus is possible when a distance between the remote control terminal apparatus and the remote control target apparatus is less than a threshold value; and a notification unit configured to notify other terminal apparatuses whether or not controlling the target apparatus is possible, the notification performed directly by radio wave, without using the remote control target apparatus; and a first communication unit configured to send commands to remotely operate the remote control target apparatus, wherein the first communication unit simultaneously sends commands to remotely operate the remote control target apparatus when the notification unit notifies the other terminal apparatuses that controlling the remote control target apparatus is not possible, and wherein the controller does not bring the remote control terminal apparatus into a state in which controlling the remote control target apparatus is possible if another remote control terminal apparatus sends a signal indicating that the another remote control terminal apparatus has a preferential use for the remote control target apparatus even if the signal is not received by the remote control terminal apparatus.

* * * * *